Patented May 1, 1951

2,550,905

UNITED STATES PATENT OFFICE 2,550,905

MERCAPTAN REMOVAL

John A. Bolt, Chicago, Ill., and Theodore B. Tom, Hammond, Ind., assignors to Standard Oil Company, Chicago, Ill., a corporation of Indiana No Drawing. Application July 20, 1944, Serial No. 545,886

1 Claim. (Cl. 252—192)

This invention relates to the treatment of hydrocarbon oils and particularly to the treatment of gasoline, naphthas, kerosene and other light petroleum distillates for the removal of mercaptans. The invention relates more specifically to the removal of mercaptans by the action of caustic alkali solutions which are promoted in their action or regenerated by the action of oxygen in the presence of certain organic catalysts of improved effectiveness.

One object of the invention is to provide a catalyst for the removal of mercaptans and for the sweetening of petroleum distillates which is more effective than catalysts used heretofore. Another object of the invention is to provide catalysts for this process which are more stable and resist destruction better than catalysts used heretofore for the purpose. Other objects of the invention will be apparent from the following description.

It has previously been observed that the oxidation of mercaptans by the action of oxygen or air in the presence of caustic alkalies can be accelerated by adding to the reaction mixture small amounts of certain phenols, as taught by the United States Patent 2,015,038 of Pevere. On investigating this reaction we have now discovered that certain of the phenols are much more effective than other phenols, some phenols having no measurable effect whatever, and we have also discovered that the more effective phenols belong to a certain class, having a common type of chemical structure. Phenols having this structure can be described as dihydroxy aromatic compounds having the hydroxyl groups in either the ortho or the para position, thus providing a possible quinoid structure on oxidation and having one other substituent which is ortho-para directing in character, said other substituent occupying a position para to one of the hydroxyl groups when the hydroxyl groups are ortho to each other. Other substituent groups may be present in the aromatic ring, if desired, as long as the required structure is not lost thereby. Stated more concisely, the phenols which we employ as oxidation catalysts for mercaptans are substituted dihydroxy aromatic compounds, in which the hydroxyl groups have a quinoid relationship, that is, they are ortho or para to each other, and there is present at least one other substituent ortho-para directing group, said substituent occupying a position para to one of the hydroxyl groups when the hydroxyls are mutually ortho.

As specific examples of the ortho-para directing groups we include the hydroxyl group, the amino group, the alkoxy group, the alkyl, the aryl, the aralkyl and the cycloalkyl groups. Examples of such compounds are 4-tertiary butyl catechol, 4-cyclohexyl catechol, and 1,2,4-trihydroxy benzene.

In carrying out the process of removing mercaptans from petroleum distillates, the distillate, for example gasoline, is intimately mixed or countercurrently extracted with a solution of a caustic alkali having a concentration of the order of 5 to 50 per cent, preferably about 10 to 25 per cent. Expressed in normality, the preferred concentration is about 2 to 7 normal. Sodium hydroxide or potassium hydroxide are commercially convenient. To the caustic solution there is added about 0.1 to 5 per cent by weight of the mercaptan oxidation catalyst hereinabove described. Oxygen or air is then introduced into the mixture of distillate and caustic solution until the mercaptans are converted to disulfides by the action of the oxygen catalyzed by the phenolic catalyst. The evil smelling mercaptans are thus converted to bland disulfides, the reaction being represented by the equation:

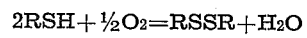

$$2RSH + \tfrac{1}{2}O_2 = RSSR + H_2O$$

If the oxidation with oxygen or air is carried out in the presence of the distillate, the disulfides will remain in solution in the distillate, but since these sulfur compounds do not react positive in the doctor test, the distillate can be made to pass the doctor specification as a sweet product by simply blowing with air in the presence of the caustic solution containing the phenolic mercaptan oxidation catalyst.

It is often desirable to eliminate the sulfur compounds as much as possible from the distillate undergoing treatment and it is particularly desirable to avoid the accumulation of disulfides in gasoline because of their adverse effect on the knock rating and lead response of the gasoline. This can be done by countercurrently extracting the mercaptans from the distillate with caustic solution in one stage of the process and removing the mercaptans from the caustic solution in the second stage where the caustic is contacted with air or oxygen. The resulting disulfides produced in the second stage of the process, being insoluble in the aqueous caustic solution, are separated sometimes with the aid of a solvent such as a light hydrocarbon, and the regenerated caustic solution is recycled to the first stage where it is used for the extraction of further amounts of distillate.

It is preferred to maintain the regeneration stage at a somewhat elevated temperature, for example, in the range of 50 to 200° F., preferably about 80 to 130° F., while the extraction step should be carried out at a lower temperature, generally the ordinary prevailing temperature of the atmosphere. An excessive amount of air oxidation in the regeneration stage should be avoided in order to prevent oxidation of phenolic catalyst. However, some loss of catalyst is unavoidable and additional catalyst is usually added to the system from time to time to make up for losses.

The removal of mercaptans from sour distillates can be facilitated greatly by the presence in the caustic solution of a mercaptan solvent sometimes referred to as a "solutizer." Examples of such solvents are the simple phenols, particularly cresols and xylenols, the organic acids, particularly those having 3 to 7 carbon atoms such as isobutyric acid, aromatic acids such as cumic acid, the alcohols, glycols, amines and hydroxyamines. The preferred amount of mercaptan solvent is about 5 to 25% of the weight of caustic solution in which it is employed. When treating certain phenols-containing stocks, particularly cracked gasoline and cracked heavy naphtha, sufficient phenols can often be absorbed by the caustic solution during operation to supply the desired amount of mercaptan solvent. The presence of mercaptan solvents in the caustic solution is especially desirable in the case where the solution is regenerated in a separate stage, since the increased concentration of mercaptan in the caustic made possible by the use of organic solvents reduces the amount of recycling required, with consequent saving in heat exchange, handling costs, extraction equipment, etc.

As an illustration of the effect of the chemical structure of our catalysts on oxidation activity, the following data show the results obtained when a solution of 5 N sodium hydroxide containing 15% of cresols and 1 gram of the catalyst was agitated with 20 cc. of n-butyl mercaptan in the presence of excess oxygen under pressure at a temperature of 115° F. The course of oxidation was determined by measuring the pressure at intervals, as an indication of absorption of oxygen. The activity index is based on the activity of hydroquinone selected as a reference standard and arbitrarily assigned the index number 100.

Test 1

| Catalyst | Pressure | | | Activity Index |
|---|---|---|---|---|
| | Initial | After 5 Min. | After 10 Min. | |
| | Lbs. | Lbs. | Lbs. | |
| None (blank) | 30.0 | 29.5 | 29.0 | 0 |
| Resorcinol | 29.5 | 29.0 | 28.5 | 0 |
| Hydroquinone | 30.0 | 25.0 | 23.0 | 100 |

Test 2

| Catalyst | Pressure | | | Activity Index |
|---|---|---|---|---|
| | Initial | After 5 Min. | After 10 Min. | |
| | Pounds | Pounds | Pounds | |
| None (blank) | 23.8 | 23.2 | 22.1 | 0 |
| Phloroglucinol | 22.8 | 22.0 | 20.6 | 6 |
| Catechol | 23.0 | 21.8 | 20.6 | 8 |
| 4,t-Butylcatechol | 22.0 | 18.1 | 14.5 | 70 |
| Hydroquinone | 22.8 | 17.3 | 12.8 | 100 |
| 4,Cyclohexylcatechol | 23.3 | 17.9 | 13.3 | 100 |
| 1,2,4-trihydroxybenzene | 23.0 | 14.9 | 10.9 | 125 |

These results show that the activity of catechol, for example, is increased many times by the introduction of the butyl or cyclohexyl group in the 4 position, and the activity of hydroquinone is increased 25% by the introduction of a third hydroxyl group in the 2 position. The results also show that in the absence of the catalyst only a very slight oxidation occurred. The results obtained with resorcinol and phloroglucinol are also included for comparison to show the low activity of polyphenols in which the hydroxyl groups are non-quinoid.

In the application of our process to petroleum stocks and particularly to unstabilized stocks, i. e. stocks which have not been depropanized, we prefer to pretreat the stock for removal of hydrogen sulfide before contacting it with the caustic solution in the mercaptan extraction operation. Hydrogen sulfide may be removed from such stocks by pretreating with caustic alkali, lime slurry, etc. Stocks containing excessive amounts of phenols, particularly cracked gasoline, may also be pretreated with caustic alkali solution to remove excess phenols which might otherwise interfere with the mercaptan extraction operation by increasing the concentration of mercaptan solvent to an undesirable extent.

Having thus described our invention what we claim is:

In a process for removing mercaptans from petroleum distillates by extraction with an aqueous alkali metal hydroxide solution of 5 to 50 per cent concentration in the presence of 5 to 25 weight per cent of cresols for solutizing mercaptan extraction, and subsequently reactivating the alkali metal hydroxide solution containing said cresols and also containing alkali metal mercaptides resulting from the extraction, the improved method of effecting reactivation which comprises contacting the mercaptide-containing solution with a gas containing free oxygen in the presence of about .1 to 5 per cent by weight of a substituted catechol of the class consisting of 4,cyclohexylcatechol and 4,t-butylcatechol at a temperature in the range of 50 to 200° F. and for a time sufficient to convert mercaptans (in the form of mercaptides) to disulfides and to substantially prevent oxidation of said substituted catechol.

JOHN A. BOLT.
THEODORE B. TOM.

REFERENCES CITED

The following references are of record in the file of this patent:

UNITED STATES PATENTS

| Number | Name | Date |
|---|---|---|
| 1,855,353 | Jacobson | Apr. 26, 1932 |
| 1,943,744 | Rosenstein | Jan. 26, 1934 |
| 2,015,038 | Pevere | Sept. 17, 1935 |
| 2,228,028 | Brower | Jan. 7, 1941 |
| 2,315,530 | Loyd | Apr. 6, 1943 |
| 2,316,092 | Loyd | Apr. 6, 1943 |
| 2,316,759 | Bond | Apr. 20, 1943 |
| 2,369,771 | Bond | Feb. 20, 1945 |

FOREIGN PATENTS

| Number | Country | Date |
|---|---|---|
| 126,544 | Hungary | Mar. 17, 1941 |

OTHER REFERENCES

Oil and Gas Journal, July 1, 1944, pp. 45 to 47.